US012705906B2

(12) United States Patent
Wu et al.

(10) Patent No.: US 12,705,906 B2
(45) Date of Patent: Aug. 11, 2026

(54) LANE LINE RECOGNITION METHOD, ELECTRONIC DEVICE AND STORAGE MEDIUM

(71) Applicant: Beijing Baidu Netcom Science Technology Co., Ltd., Beijing (CN)

(72) Inventors: Bin Wu, Beijing (CN); Kai Zhong, Beijing (CN); Tongbin Zhang, Beijing (CN); Jianzhong Yang, Beijing (CN); Zhen Lu, Beijing (CN); Deguo Xia, Beijing (CN); Jizhou Huang, Beijing (CN)

(73) Assignee: Beijing Baidu Netcom Science Technology Co., Ltd., Beijing (CN)

( * ) Notice: Subject to any disclaimer, the term of this patent is extended or adjusted under 35 U.S.C. 154(b) by 884 days.

(21) Appl. No.: 18/092,518

(22) Filed: Jan. 3, 2023

(65) Prior Publication Data

US 2024/0071102 A1 Feb. 29, 2024

(30) Foreign Application Priority Data

Aug. 29, 2022 (CN) ........................ 202211036766.6

(51) Int. Cl.
*G06V 20/56* (2022.01)
*G06V 10/26* (2022.01)
(Continued)

(52) U.S. Cl.
CPC ............ *G06V 20/588* (2022.01); *G06V 10/26* (2022.01); *G06V 10/42* (2022.01); *G06V 10/44* (2022.01);
(Continued)

(58) Field of Classification Search
CPC ...... G06V 20/588; G06V 20/49; G06V 10/26; G06V 10/42; G06V 10/44; G06V 10/751;
(Continued)

(56) References Cited

U.S. PATENT DOCUMENTS

2018/0188059 A1* 7/2018 Wheeler ................ G06T 17/05
2019/0035101 A1* 1/2019 Kwant ................ G06V 20/588
(Continued)

FOREIGN PATENT DOCUMENTS

CN 112016532 A 12/2020
CN 112686233 A 4/2021
(Continued)

OTHER PUBLICATIONS

Translated version of CN113762004 (Year: 2021).*
(Continued)

*Primary Examiner* — Carol W Chan
(74) *Attorney, Agent, or Firm* — Faegre Drinker Biddle & Reath LLP

(57) ABSTRACT

Provided are a lane line recognition method, an electronic device and a storage medium, relating to a technical field of artificial intelligence, in particular to technical fields of intelligent transportation, automatic driving and deep learning. The lane line recognition method includes: extracting a basic feature of an original image; recognizing at least one lane line node in the original image by using the basic feature of the original image; extracting a local feature from the basic feature of the original image by using the at least one lane line node; fusing the basic feature and the local feature; and recognizing a lane line in the original image based on a fused result.

20 Claims, 6 Drawing Sheets

(51) Int. Cl.

| | |
|---|---|
| ***G06V 10/42*** | (2022.01) |
| ***G06V 10/44*** | (2022.01) |
| ***G06V 10/75*** | (2022.01) |
| ***G06V 10/80*** | (2022.01) |

(52) U.S. Cl.
CPC .......... *G06V 10/751* (2022.01); *G06V 10/806* (2022.01)

(58) Field of Classification Search
CPC ...... G06V 10/806; G06V 10/25; G06V 10/82; G06V 10/454; G06V 10/469
See application file for complete search history.

(56) References Cited

U.S. PATENT DOCUMENTS

| | | | |
|---|---|---|---|
| 2020/0026930 A1* | 1/2020 | Gu | G06V 10/762 |
| 2021/0206380 A1 | 7/2021 | Maheshwari et al. | |
| 2022/0307841 A1* | 9/2022 | Zhang | G01C 21/3446 |

FOREIGN PATENT DOCUMENTS

| | | | |
|---|---|---|---|
| CN | 112819007 A | 5/2021 | |
| CN | 113313031 A | 8/2021 | |
| CN | 113468967 A | 10/2021 | |
| CN | 113762004 A | * 12/2021 | G06F 18/241 |
| CN | 114120289 A | 3/2022 | |
| DE | 102018204246 A1 | 9/2019 | |

OTHER PUBLICATIONS

The State Intellectual Property Office of People's Republic of China; Chinese Application No. 202211036766.6; First Office Action; 9 pages; dated Oct. 19, 2022.

The State Intellectual Property Office of People's Republic of China; Chinese Application No. 202211036766.6; Notification to Grant Patent Right; 5 pages; dated Nov. 5, 2022.

European Patent Office; Ep Application No. 23150179.2; European Extended Search Report; 8 pages; dated Aug. 21, 2023.

Japanese Patent Office; Jp Application No. 2023-050736; Notice of Allowance; 3 pages; dated May 12, 2021.

Fang et al.; TPNet: Trajectory Proposal Network for Motion Prediction; arxiv.org, Cornell University Library; 10 pages; Apr. 26, 2020.

Liu et al.; CondLaneNet: a Top-to-down Lane Detection Framework Based on Conditional Convolution; 2021 IEEE/CVR International Conference on Computer Vision (ICCV); IEEE; 10 pages; dated Oct. 10, 2021.

Korean Patent Office; First Office Action; KR Application No. 10-2023-0022203; 9 pages; dated Mar. 15, 2026.

Qu, Zhan et al.; Focus on Local: Detecting Lane Marker from Bottom Up via Key Point; Proceedings of the IEEE/CVF Conference on Computer Vision and Pattern Recognition (CVPR); 9 pages; 2021.

Wang, Jinsheng et al.; A Keypoint-based Global Association Network for Lane Detection; Proceedings of the IEEE/CVF Conference on Computer Vision and Pattern Recognition (CVPR); 9 pages; 2022.

Law, Hei et al.; CornerNet: Detecting Objects as Paired Keypoints; European Conference on Computer Vision (ECCV), Springer; 14 pages; 2018.

* cited by examiner

LANE LINE RECOGNITION METHOD, ELECTRONIC DEVICE AND STORAGE MEDIUM

CROSS-REFERENCE TO RELATED APPLICATIONS

The present application claims priority to Chinese Patent Application No. CN 202211036766.6, filed with the China National Intellectual Property Administration on Aug. 29, 2022, the disclosure of which is hereby incorporated herein by reference in its entirety.

TECHNICAL FIELD

The present disclosure relates to a technical field of artificial intelligence, in particular to technical fields of intelligent transportation, automatic driving, high precision maps and deep learning.

BACKGROUND

Recently, with continuous development of artificial intelligence technology, high precision mapping technology has gradually made breakthrough progress. In the high precision mapping, lane line detection is the core technology of map element perception, and plays an extremely important role in a direction of high precision map data production. A lane line detection method based on deep learning has gradually become the mainstream. The lane line detection method based on deep learning is usually a method based on semantic segmentation and post-processing lane line extraction, and results in poor lane line recognition effect due to its redundant post-processing steps.

SUMMARY

The present disclosure provides a lane line recognition method and apparatus, an electronic device and a storage medium.

According to an aspect of the present disclosure, provided is a lane line recognition method, including: extracting a basic feature of an original image; recognizing at least one lane line node in the original image by using the basic feature of the original image; extracting a local feature from the basic feature of the original image by using the at least one lane line node, and fusing the basic feature and the local feature; and recognizing a lane line in the original image based on a fused result.

According to another aspect of the present disclosure, provided is a lane line recognition apparatus, including: a main module configured to extract a basic feature of an original image; a node recognizing module configured to recognize at least one lane line node in the original image by using the basic feature of the original image; an extracting and fusing module configured to extract a local feature from the basic feature of the original image by using the at least one lane line node, and fuse the basic feature and the local feature; and a lane line recognizing module configured to recognize a lane line in the original image based on a fused result.

According to another aspect of the present disclosure, provided is an electronic device including at least one processor and a memory connected in communication with the at least one processor. The memory stores an instruction executable by the at least one processor, and the instruction, when executed by the at least one processor, enables the at least one processor to execute any method of the embodiment of the present disclosure.

According to another aspect of the present disclosure, provided is a non-transitory computer-readable storage medium storing a computer instruction thereon, and the computer instruction is used to cause a computer to execute any method of the embodiment of the present disclosure.

The lane line recognition method proposed in the present disclosure can recognize the lane line based on the fused result of the basic feature of the original image and the local feature, and thus avoids complex post-processing steps, thereby improving lane line recognition effect.

It should be understood that the content described in this part is not intended to identify key or important features of the embodiment of the present disclosure, nor is it used to limit the scope of the present disclosure. Other features of the present disclosure will be easily understood by the following description.

BRIEF DESCRIPTION OF THE DRAWINGS

The accompanying drawings are used to better understand the present solution, and do not constitute a limitation to the present disclosure.

DETAILED DESCRIPTION

Hereinafter, descriptions to the exemplary embodiment of the present disclosure are made with reference to the accompanying drawings, include various details of the embodiment of the present disclosure to facilitate understanding, and should be considered as merely exemplary. Therefore, those having ordinary skill in the art should realize, various changes and modifications may be made to the embodiment described herein, without departing from the scope and spirit of the present disclosure. Likewise, for clarity and conciseness, descriptions of well-known functions and structures are omitted in the following descriptions.

Lane line detection algorithms are mainly grouped into traditional detection algorithms and lane line detection algorithms based on deep learning. Among them, the mainstream of the lane line detection algorithms based on deep learning is a manner based on semantic segmentation and post-processing lane line extraction, which results in poor lane line recognition effect due to its redundant post-processing steps.

Figure 1:
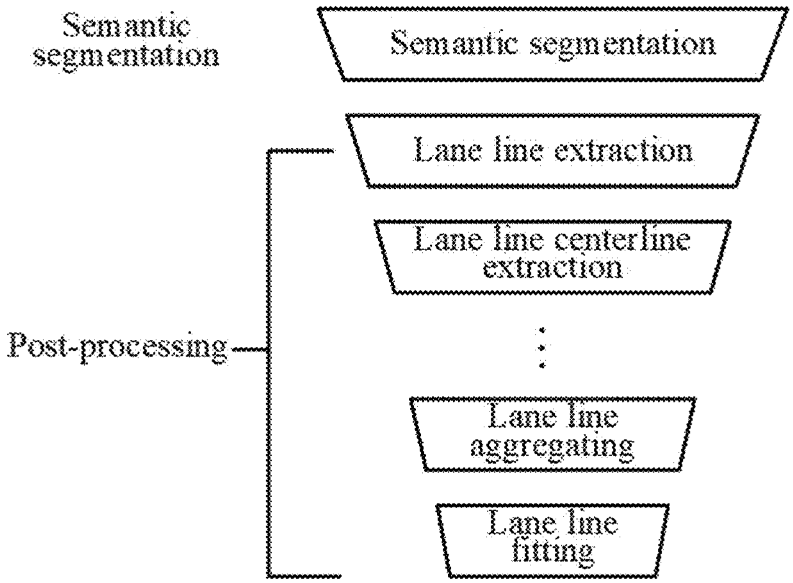
FIG. 1 is a schematic diagram of an existing lane line recognition method based on semantic segmentation and post-processing.

FIG. 1 is a schematic diagram of an existing lane line recognition method based on semantic segmentation and post-processing. As shown in FIG. 1, the recognition method mainly includes the following stages.

1. An original image is segmented in units of pixel based on a semantic segmentation algorithm to obtain a semantic segmentation map.
2. A lane line profile is extracted based on the semantic segmentation map.
3. A lane line centerline is extracted based on the lane line profile.
4. Lane line aggregating is performed on extracted lane line centerlines to form one lane line from a plurality of lane lines in the same direction.
5. The aggregated lane line is fitted into a smooth lane line curve, and the lane line recognition is completed.

It can be seen that the above procedure includes a plurality of processing steps, and redundant steps will lead to poor lane line recognition effect. For example, in the case where each step has accuracy of 90%, theoretical accuracy of the final lane line recognition is about 90%*90%*90%*90%*90%=59%. That is, since a recognition error of a previous step will accumulate in a next step and the exiting lane line recognition method based on semantic segmentation and post-processing include many processing steps, the exiting lane line recognition method has poor recognition effect on the lane line.

Figure 2:
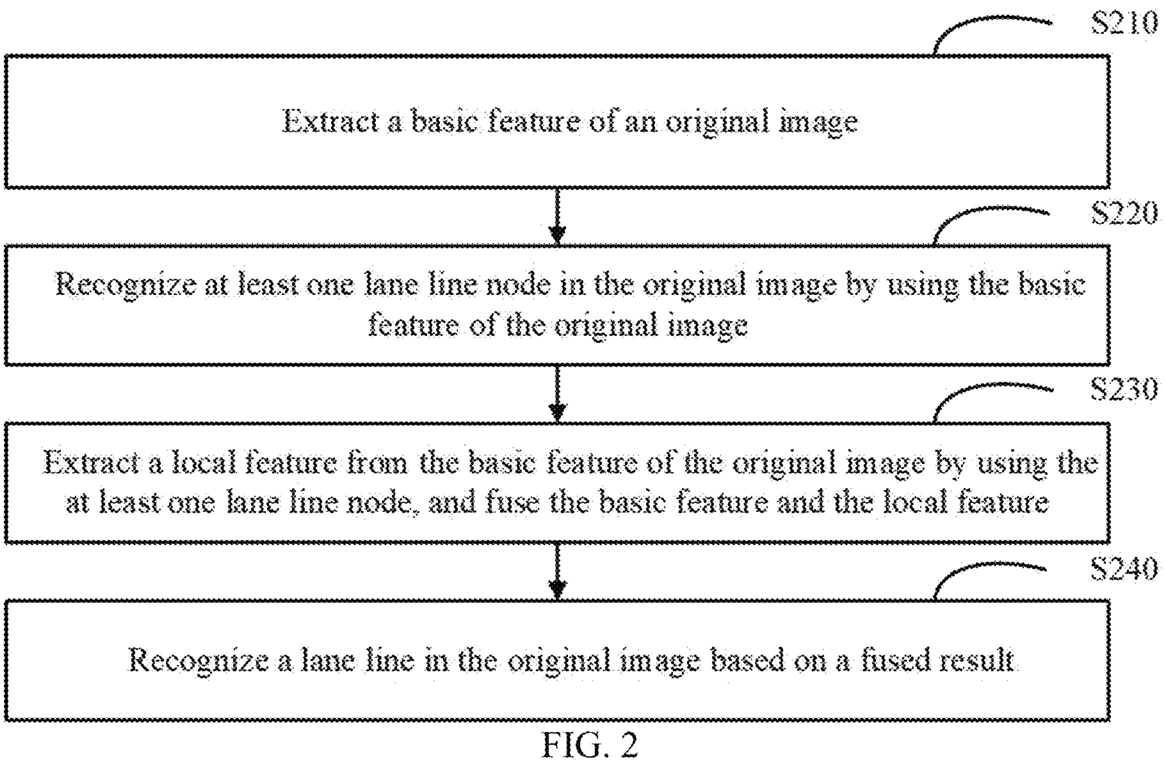
FIG. 2 is an implementation flow diagram of a lane line recognition method according to the embodiment of the present disclosure.

The embodiment of the present disclosure proposes a lane line recognition method, which discards redundant post-processing steps and can improve lane line recognition effect. FIG. 2 is an implementation flow diagram of a lane line recognition method according to the embodiment of the present disclosure, which includes the following steps.

In S210, a basic feature of an original image is extracted.

In S220, at least one lane line node in the original image is recognized by using the basic feature of the original image.

In S230, a local feature is extracted from the basic feature of the original image by using the at least one lane line node, and the basic feature and the local feature are fused.

In S240, a lane line in the original image is recognized based on a fused result.

The original image may be an image in a traffic scene, for example, it may be image data acquired by a vehicle mounted camera apparatus, an intelligent traffic camera apparatus or the like. The original image may have many forms such as a static picture, a dynamic video image, a video frame extracted from a video image, or the like. The embodiment of the present disclosure does not limit the form and acquisition of the original image.

In S220, the lane line node recognized by using the basic feature has preliminary information about the lane line, but recognition effect is relatively poor due to weak expressivity of the basic feature. The embodiment of the present disclosure fuses the local feature and the basic feature by the following steps, and finally recognizes the lane line by using the fused result. Since the local feature mainly represents feature information around the lane line node and the basic feature represents overall information of the original image, the fused result can not only represent the overall information of the original image, but also well represent the local information around the lane line node, so that the fused result is better for recognizing the lane line.

It can be seen from the above procedure that the lane line recognition method proposed in the embodiment of the present disclosure is an end-to-end high-precision lane line detection method; that is, the input is an original image and the output is a complete high-precision lane line. Compared with the multi-stage processing method including lane line profile extracting, lane line centerline extracting, lane line aggregating, lane line fitting and the like as shown in FIG. 1, the embodiment of the present disclosure avoids fussy and redundant processing steps, and can improve the lane line recognition effect and improve accuracy and recall rate of the lane line recognition.

The lane line recognition method proposed in the embodiment of the present disclosure may be implemented by using one or more neural network models or deep learning models (hereinafter, referred to as models for short).

In some implementations, the embodiment of the present disclosure may extract the basic feature of the original image, that is, perform the above step S210, by using a backbone network of a model. For example, the original image obtained by a vehicle mounted camera, an intelligent traffic camera apparatus or the like is inputted to a backbone network of a neural network model, and the backbone network of the neural network model outputs the basic feature of the original image.

The backbone network may adopt a network for feature extraction, which may be used to extract information in an image for usage of a subsequent network. The backbone network often adopts a deep residual network (ResNet), a visual geometry group (VCG) network, or the like, and these networks have been proved that they have strong feature extraction capability in image classification, image recognition and other issues. When using such network as the backbone network in the embodiment of the present disclosure, the network may be directly loaded with model parameters which have been trained and then connected to the subsequent network. During a training process, a whole network may be trained synchronously.

In some implementations, a manner of recognizing the at least one lane line node in the original image by using the basic feature of the original image (such as the above step S220) in the embodiment of the present disclosure includes: determining node distribution information corresponding to the original image by using the basic feature of the original image. The node distribution information represents the at least one lane line node in the original image and includes a type of each pixel.

It may implement preliminary recognition of the lane line node in the original image by determining the node distribution information in the original image, which provides a basis for extracting the local feature for representing the feature information around the lane line node.

For example, the type is a background, the lane line node, or a lane line edge.

In some implementations, the embodiment of the present disclosure may use one or more neural network models, or one or more layers in one neural network model to recognize the node distribution information by using the basic feature extracted in the step S210. For example, the node distribution information may be a node map, and each pixel in the node map may has a value of 0, 1 or 2. When the value is 0, it represents that the pixel pertains to the background. When the value is 1, it represents that the pixel pertains to the lane line node. When the value is 2, it represents that the pixel pertains to the lane line edge.

In some implementations, the above "background" may refer to parts other than the lane line which includes the lane line node and the lane line edge.

In this example, the value 1 of the pixel represents that the pixel is the lane line node, and other values of the pixel represent that the pixel is not the lane line node.

The above values of the pixel and meaning thereof are only examples, which are not limited by the embodiment of the present disclosure. The embodiment of the present disclosure may adopt any value to represent that the pixel pertains to the lane line node. Moreover, in the embodiment of the present disclosure, the background and the lane line edge may not be distinguished from each other. For example, each pixel in the node map may has a value of 0 or 1. When the value is 1, it represents that the pixel pertains to the lane line node, and when the value is 0, it represents that the pixel does not pertain to the lane line node.

In some implementations, a manner of extracting the local feature from the basic feature of the original image by using the lane line node in the step S230 in the embodiment of the present disclosure includes: constructing a plurality of local boxes by using the lane line node, and segmenting the basic feature of the original image by using the plurality of local boxes, to obtain the local feature.

Figure 3:
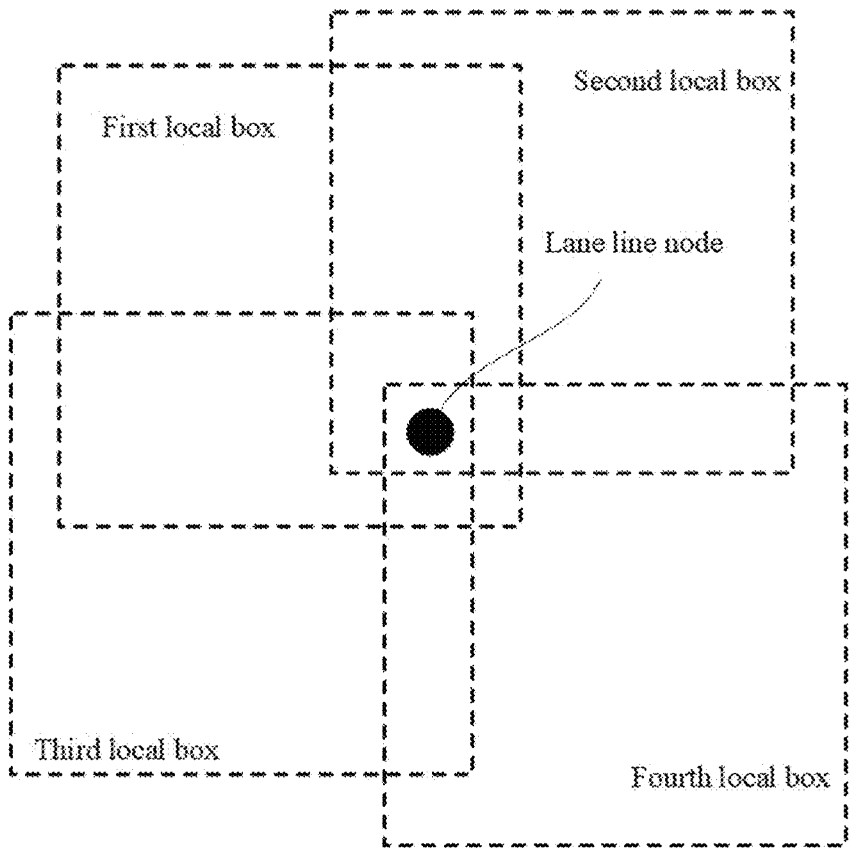
FIG. 3 is a schematic diagram of a local feature extraction method according to the embodiment of the present disclosure.

FIG. 3 is a schematic diagram of a local feature extraction method according to the embodiment of the present disclosure. As shown in FIG. 3, the embodiment of the present disclosure may construct four local boxes by using the lane line node, to enable the lane line node to be located at a lower right corner, a lower left corner, an upper right corner or an upper left corner of respective one of the four local boxes, and dimensions of the four local boxes are preset values. For example, in FIG. 3, the lane line node is located at the lower right corner of the first local box, at the lower left corner of the second local box, at the upper right corner of the third local box, and at the upper left corner of the fourth local box. Then the basic feature of the original image is segmented by using the four local boxes respectively, and the date obtained by segmenting is the local feature.

In the above example, it is possible that the local feature obtained by segmenting may mainly represent the lane line node and the feature information around the lane line node, by segmenting the basic feature by adopting the four boxes with the lane line node located at the lower right corner, the lower left corner, the upper right corner or the upper left corner, thereby improving the lane line recognition effect.

In some implementations, the basic feature of the original image may be represented as a feature vector, such as a feature vector having a size of H*W*64, where H is a height of the original image (in units of a quantity of pixels), W is a width of the original image (in units of the quantity of pixels). Taking a pixel A as an example, the pixel A is a lane line node, a processing of extracting a local feature corresponding to the pixel A includes the followings.

1. Coordinates x, y of the pixel A is obtained.
2. Four 5*5 local boxes are respectively constructed with the coordinates of the pixel A located at the lower right corner, the lower left corner, the upper right corner or the upper left corner of respective one of the four local boxes. Herein, 5*5 is a preset dimension of the local boxes, which is only an example.
3. The basic feature of the image is segmented by using the constructed local boxes to obtain the local feature.

As such, one pixel corresponds to four local boxes each having a size of 5*5, each local box needs to segment the basic feature of the original image (i.e., a feature vector of H*W*64) to extract the local feature, and thus a local feature vector of the one pixel has a size of 4*64*5*5. To facilitate subsequent fusing of the extracted local feature, the local feature vector may be adjusted to a three-dimensional vector, such as a feature vector having a size of 256*5*5.

It should be noted that the local boxes shown in FIG. 3 are abstract representations, which are used to represent extracting of the local feature (represented by a vector) of adjacent parts of the lane line node, and do not represent specific shapes.

The above example is introduced from a perspective of a single lane line node. For the single lane line node, its corresponding local feature may be obtained. If a plurality of lane line nodes are recognized in the forgoing steps, corresponding local feature may be obtained for each lane line node in this step, and the basic feature and local features of the plurality of lane line nodes are fused in the subsequent process.

In some implementations, the basic feature of the original image is represented by a first vector, and the local feature of the lane line node is represented by a second vector.

A manner of fusing the basic feature and the local feature may include: combining the first vector and the second vector to obtain a third vector.

A feature obtained by fusing the basic feature and the local feature may still be represented by a form of vector by using the manner of combining vectors, which is convenient for use in the subsequent lane line recognition process.

For example, if the plurality of lane line nodes are recognized, the local feature corresponding to each lane line node may be represented by one second vector. As such, when the basic feature and the local feature are fusing, the first vector and a plurality of second vector (that is the vector representation of local features corresponding to all lane line nodes) may be combined to obtain the third vector. The fused third vector may be a three-dimensional vector.

The above processes of extracting the local feature and fusing the basic feature and the local feature may be implemented by adopting one or more neural network models or one or more layers in one neural network model.

The embodiment of the present disclosure can greatly improve the recognition accuracy of the lane line, so as to achieve high-precision recognition of the lane line at pixel level by adopting the manner of fusing the local feature of the lane line and the global feature, and even in a special scenario such as vehicle occlusion, lane line being covered or the like, the embodiment of the present disclosure can greatly improve the recall rate of the lane line recognition and the robustness of the model through an end-to-end generative network.

In some implementations, a manner of recognizing the lane line in the original image based on the fused result (the above step S240) in the embodiment of the present disclosure may include: determining lane line coding information of the original image based on the fused result, and recognizing the lane line in the original image based on the lane line coding information.

In some implementations, the lane line coding information of the original image includes first information of each pixel in the original image, and the first information includes at least one of (1) whether the pixel is the lane line node, (2) a quantity of adjacent lane line nodes of the pixel, or (3) a positional relationship of the pixel and an adjacent lane line node.

For example, in the case where a certain pixel is the lane line node, the first information of the pixel includes the quantity of the adjacent lane line nodes of the pixel and the positional relationship of the pixel and the adjacent lane line nodes. For another example, in the case where a certain pixel is not a lane line node, the first information of the pixel does not include the quantity of the adjacent lane line nodes of the pixel or the positional relationship of the pixel and the adjacent lane line nodes. Correspondingly, a part for indicating the quantity of the adjacent lane line nodes of the pixel and a part for indicating the positional relationship of the pixel and the adjacent lane line nodes in the first information have default values.

It can be seen from the example of the above lane line coding information, the first information of each pixel in the lane line coding information includes information indicating whether the pixel is a lane line node and the positional relationship between the pixel and the adjacent lane line nodes, which can comprehensively cover lane line related information of the pixel, ensuring the lane line recognition effect.

In some implementations, in the case where the pixel is a lane line node, the positional relationship between the pixel and the adjacent lane line node may include: a deflection angle of a connecting line between the pixel and the adjacent lane line node relative to a coordinate axis of the original image, and a length of the connecting line between the pixel and the adjacent lane line node. The coordinate axis herein may refer the horizontal coordinate axis or the vertical coordinate axis. Such representation method of the positional relationship can use less data to represent the positional relationship between the lane line nodes, and reduce the amount of data and the difficulty of data processing.

Alternatively, in the case where the pixel is a lane line node, the positional relationship between the pixel and the adjacent lane line node may include: an offset of the adjacent lane line node relative to the pixel in a horizontal direction and an offset of the adjacent lane line node relative to the pixel in a vertical direction.

The embodiment of the present disclosure may also adopt other manners to represent the positional relationship, which will not be listed herein.

In some implementations, the first information of each pixel may be represented by a three-dimensional vector. Two elements in the three-dimensional vector represent a position of the pixel in the original image (for example, including a position in the horizontal direction and/or a position in the vertical direction), and the third element in the three-dimensional vector represents the first information of the pixel.

During the lane line detection, a coding form of the lane line is very important. Only by effectively coding the lane line, can a deep learning algorithm recognize the lane line in the image more accurately, and provide a more direct representation of the lane line, which makes it possible to achieve end-to-end lane line detection. The lane line coding proposed in the embodiment of the present disclosure codes the lane line in the image to a form of vector through a coding algorithm.

Figure 4:
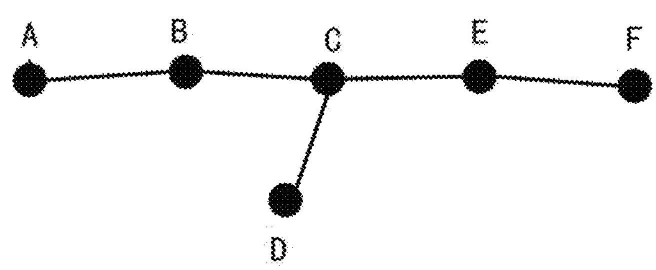
FIG. 4 is a schematic diagram of lane line pixel coding according to the embodiment of the present disclosure.

The embodiment of the present disclosure codes the lane line to the three-dimensional vector, that is, the above lane line coding information is represented by a form of the three-dimensional vector. The three-dimensional vector may effectively represent a specific position of the lane line in the image, and may also support the deep learning for the end-to-end lane line detection and recognition. FIG. 4 is a schematic diagram of lane line pixel coding according to the embodiment of the present disclosure. Points A, B, C, D, E and F in FIG. 4 are nodes constituting the lane line. The following dictionary is used to code a lane line structure in FIG. 4. The dictionary includes a plurality of key-value pairs. Each key-value pair represents coordinates of one lane line node and coordinates of all adjacent lane line nodes of the lane line node.

```
{
A : [ B ],
B: [ A, C ],
C: [ B, D, E ],
D: [ C ],
E: [ C, F ],
F: [ E ]
}
```

It can be seen from the above dictionary that the adjacent lane line node of the lane line node A includes B, and the adjacent lane line nodes of the lane line node B include A and C, and the like.

The above lane line coding structure cannot be directly used for training of an end-to-end lane line detection algorithm. In order to solve this problem, the embodiment of the present disclosure may code part of information to the three-dimensional vector that can be used for training, that is, to the lane line coding information in the above process of the embodiment. For a certain image, each pixel in the image needs to be coded. The coding information includes the following three parts.

1. Node bit: 1 bit code, indicating whether the current pixel is a lane line node. For example, when this bit is set to 0, it indicates the pixel is not a lane line node, and when this bit is set to 1, it indicates the pixel is a lane line node.
2. Link bits: 6-bit code, if the current pixel is a lane line node, the Link bits indicate whether there are adjacent lane line nodes and how many the adjacent lane line nodes exist. The default value of the Link bits is 0 for all positions (such as "000000"). For example, if there are N (which is a positive integer) adjacent lane line nodes, the first N bits of 0 are modified to 1 from left to right, indicating that there are the adjacent lane line nodes. For example, if the Link bits of a certain pixel are "000000", it indicates that the lane line node represented by the pixel has no adjacent lane line node. For another example, if the Link bits of a certain pixel are "111000", it indicates that the lane line node represented by the pixel has three adjacent lane line nodes. It can be seen that in this example, at most 6 adjacent lane line nodes of one pixel can be represented. Of course, a form of 6-bit code of the Link bits is only an example. If the code of the Link bit is set to a different length, the quantity of the adjacent lane line nodes that can be represented at most will also change. If the Node bit of a certain pixel is "0", which indicates that the pixel is not a lane line node, the Link bits of the pixel may be "000000".
3. Positional relationship (Dx&Dy) bits: 12-bit code, indicating the positional relationship of the current pixel of the adjacent lane line nodes. Default value is 0 for all positions, such as (0, 0)*6. If the current pixel is a lane line node, a (Dx&Dy) bit corresponding to a position of "1" in the Link bits respectively represents a deflection angle of a connecting line between the pixel and the adjacent lane line node relative to the coordinate axis of the original image and a length of the connecting line between the pixel and the adjacent lane line node.

Figure 5:
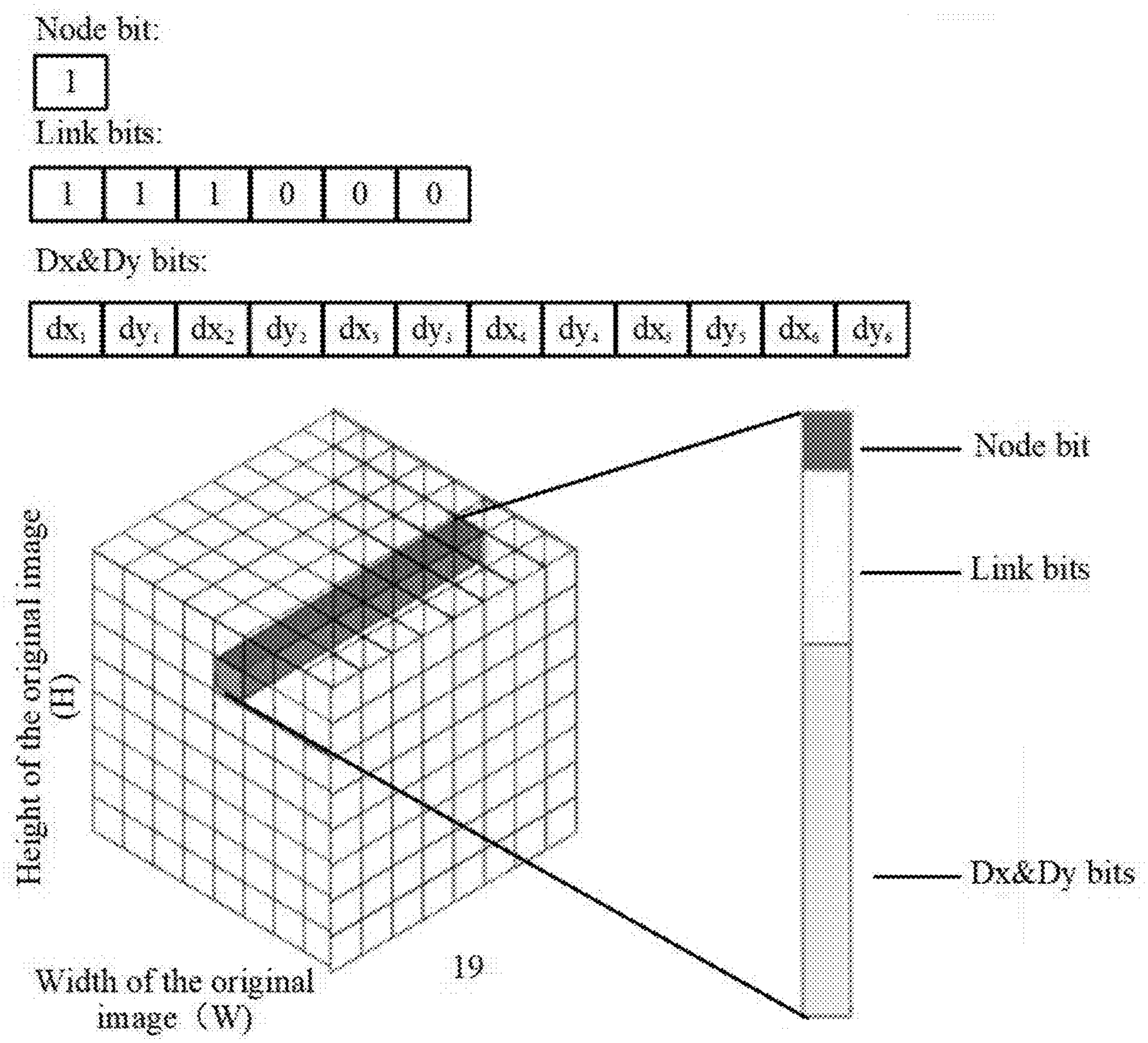
FIG. 5 is a schematic diagram of lane line coding information according to the embodiment of the present disclosure.

FIG. 5 is a schematic diagram of lane line coding information according to the embodiment of the present disclosure. As shown in FIG. 5, the three-dimensional lane line coding vector can represent the lane line node in the original image. A size of the three-dimensional vector representation is H*W*19, where H is the height of the original image (in units of a quantity of pixels), W is the width of the original image (in units of the quantity of pixels). It should be emphasized that “19” in the size of the three-dimensional vector is only an example, and it is related to a coding manner of a signal pixel. When the coding form changes, the size of the three-dimensional vector also changes.

In this way, each pixel in the original image may be coded in turn, so that each pixel has a 19-bit code, and thus the lane line structure of the entire original image is coded into the three-dimensional vector. An end-to-end lane line recognition model may be trained and learned based on the lane line coding structure. It can be seen that the embodiment of the present disclosure innovates the lane line map coding algorithm by adopting the coding manner, which can code the lane line in the image into the three-dimensional vector, provide a feasible coding manner for construction of an end-to-end lane line detection model based on deep learning, effectively solve a problem of lane line coding in end-to-end lane line training, and further improve the accuracy of lane line recognition.

The lane line recognition method proposed in the embodiment of the disclosure is described above, and the lane line recognition may be implemented by one or more neural network models. This scheme has made innovations in two aspects: the first is to preliminarily recognize the lane line node in the original image, so as to extract the local feature, fuse the local information with the basic feature, and use the fused information for the lane line recognition, which can improve the accuracy of the lane line recognition; and the second is to code the fused information, and use the coding manner proposed in the present disclosure to code and obtain the three-dimensional vector which can be used for the final lane line recognition to further improve end-to-end accurate recognition of the lane line.

Figure 6:
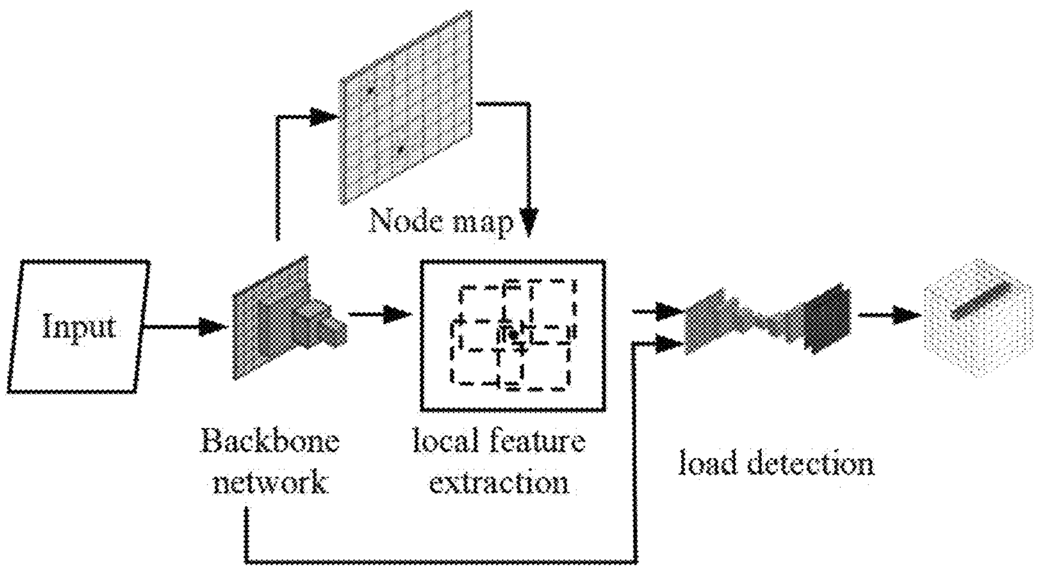
FIG. 6 is a schematic diagram of an overall frame of lane line recognition according to the embodiment of the present disclosure.

The lane line recognition method proposed in the embodiment of the present disclosure may be realized by using a neural network model. FIG. 6 is a schematic diagram of an overall frame of lane line recognition according to the embodiment of the present disclosure. As shown in FIG. 6, the backbone network extracts features from the input original image to obtain the basic feature of the original image which is used as the basic information for subsequent lane line recognition. Based on this basic feature, the lane line node in the original image may be recognized, and the information of lane line node may be represented by the node image in FIG. 6. The lane line node extracted in this step is a preliminary extraction. Then, the local feature is extracted from the basic feature by using the information of the lane line node, and the basic feature and local feature are fused. Based on the fused features, the neural network algorithm may be used to predict the lane line coding vector, and convert the fused feature into a corresponding lane line coding vector. The embodiment of the present disclosure does not specifically limit the neural network algorithm. Finally, based on the lane line coding vector, a final lane line recognition result may be obtained. The process of converting the lane line coding vector to the lane line recognition result may use an inverse operation of the above coding process which may refer to the coding process shown in FIGS. 4 and 5, and will not be repeated herein.

Figure 7:
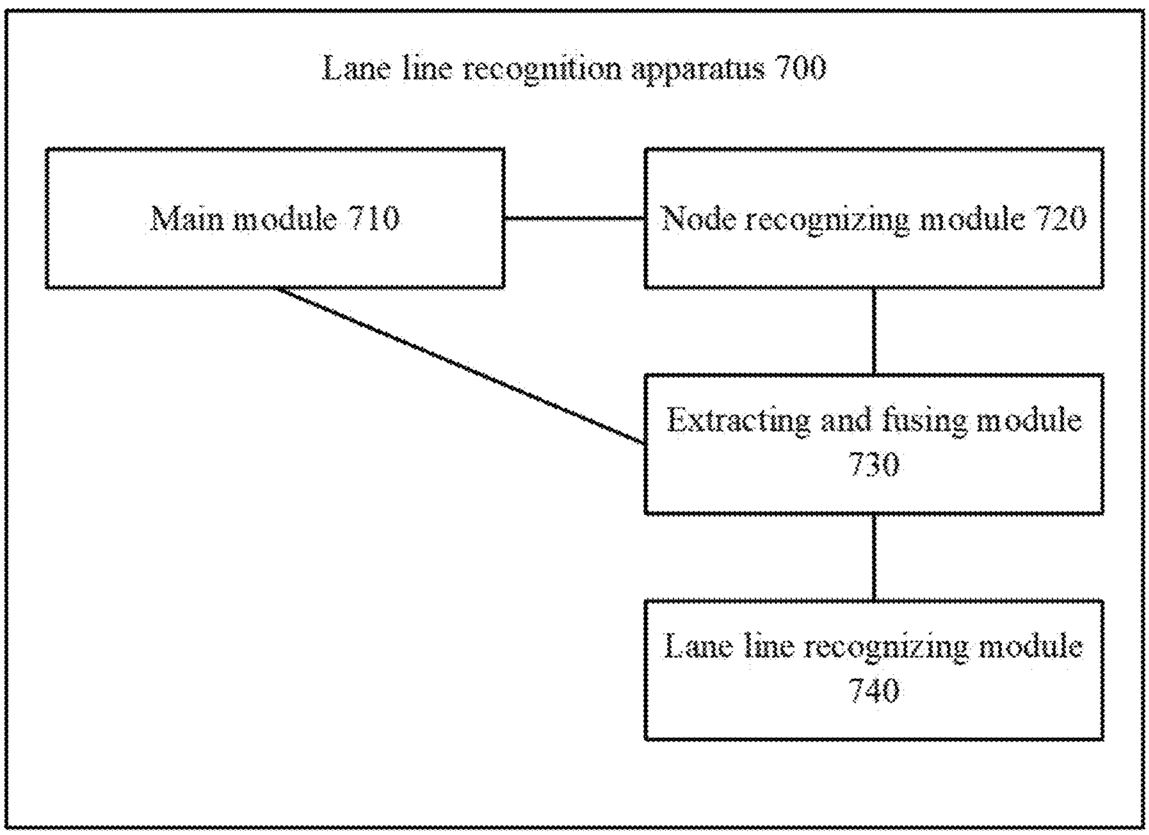
FIG. 7 is a structural diagram of a lane line recognition apparatus 700 according to the embodiment of the present disclosure.

The embodiment of the present disclosure also proposes a lane line recognition apparatus. FIG. 7 is a structural diagram of a lane line recognition apparatus 700 according to the embodiment of the present disclosure, which includes: a main module 710 configured to extract the basic feature of the original image; a node recognizing module 720 configured to recognize the at least one lane line node in the original image by using the basic feature of the original image; an extracting and fusing module 730 configured to extract the local feature from the basic feature of the original image by using the at least one lane line node, and fuse the basic feature and the local feature; and a lane line recognizing module 740 configured to recognize the lane line in the original image based on the fused result.

Figure 8:
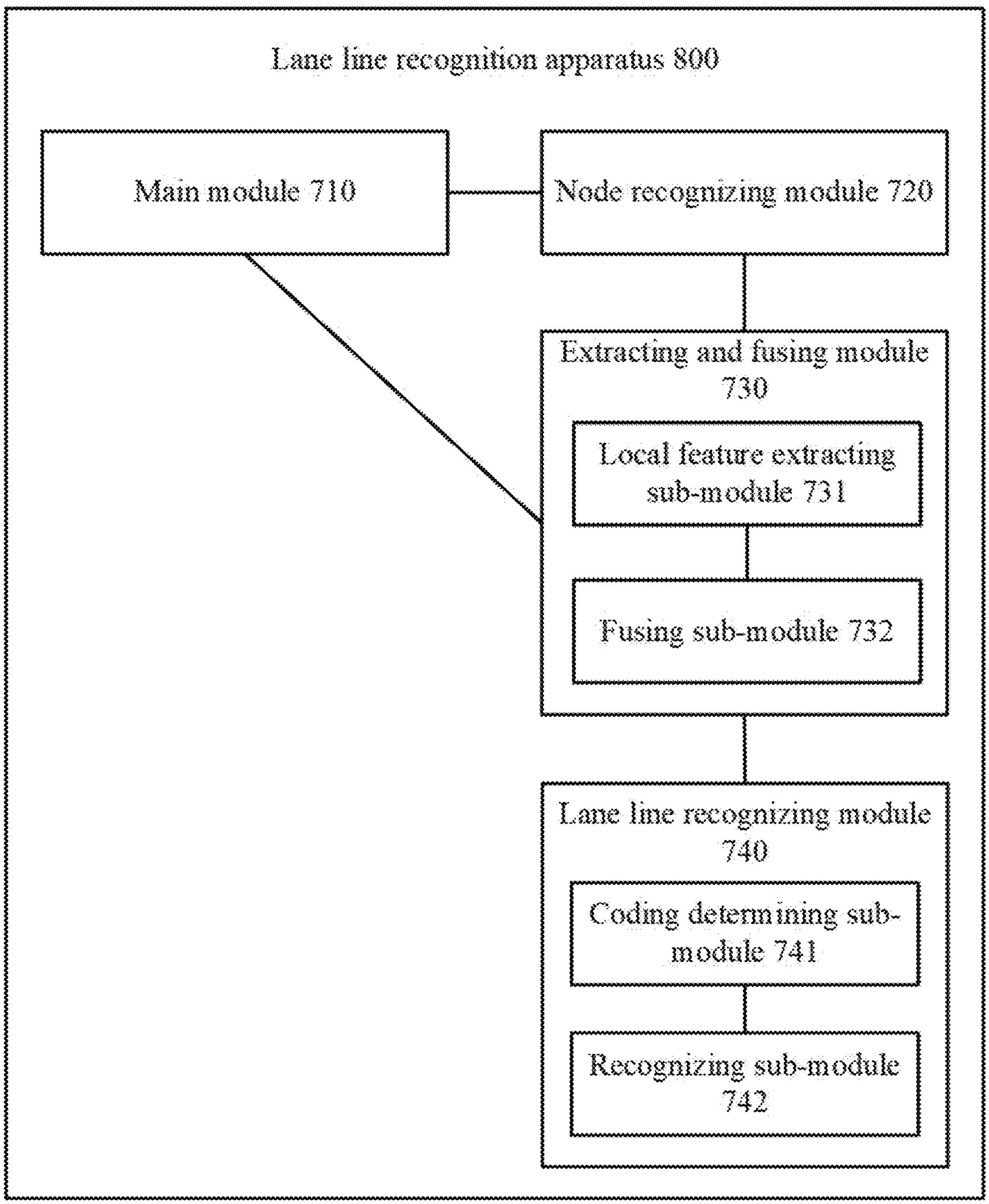
FIG. 8 is a structural diagram of a lane line recognition apparatus 800 according to the embodiment of the present disclosure.

FIG. 8 is a structural diagram of a lane line recognition apparatus 800 according to the embodiment of the present disclosure. As shown in FIG. 8, in some implementations, the lane line recognizing module 740 proposed in the embodiment of the present disclosure includes: a coding determining sub-module 741 configured to determine the lane line coding information of the original image based on the fused result, the lane line coding information of the original image including the first information of each pixel in the original image, and the first information including at least one of whether the pixel is the lane line node, the quantity of the adjacent lane line nodes of the pixel, or the positional relationship of the pixel and the adjacent lane line node; and a recognizing sub-module 742 configured to recognize the lane line in the original image by using the lane line coding information.

In some implementations, the first information of each pixel is represented by the three-dimensional vector; and two elements in the three-dimensional vector represent the position of the pixel in the original image, and the other element in the three-dimensional vector represents the first information of the pixel.

In some implementations, in the case where the pixel is the lane line node, the positional relationship of the pixel and the adjacent lane line node includes: the deflection angle of the connecting line between the pixel and the adjacent lane line node relative to the coordinate axis of the original image; and the length of the connecting line between the pixel and the adjacent lane line node.

In some implementations, the extracting and fusing module 730 includes: a local feature extracting sub-module 731 configured to construct the plurality of local boxes by using the lane line node, and segment the basic feature of the original image by using the plurality of local boxes, to obtain the local feature.

In some implementations, the local feature extracting sub-module 731 is configured to construct the four local boxes by using the lane line node with the lane line node located at the lower right corner, the lower left corner, the upper right corner or the upper left corner of respective one of the four local boxes, and the dimensions of the four local boxes are the preset values.

In some implementations, the basic feature is represented by the first vector, and the local feature is represented by the second vector. The extracting and fusing module 730 further includes: a fusing sub-module 732 configured to combine the first vector and the second vector to obtain the third vector.

In some implementations, the node recognizing module 720 is configured to determine the node distribution information corresponding to the original image by using the basic feature of the original image, and the node distribution information represents the at least one lane line node in the original image and includes a type of each pixel, the type being the background, the lane line node, or the lane line edge.

The lane line recognition apparatus proposed by the embodiment of the present disclosure may be implemented by one or more neural network models. For example, the lane line recognition apparatus proposed by the embodiment of the present disclosure may be constituted by deploying the one or more neural network models in one or more servers. The lane line recognition apparatus may realize the end-to-end lane line recognition by using the original, with adopting any lane line recognition method described above.

Descriptions for specific functions and examples of each module and sub-module in the apparatus of the embodiment of the present disclosure may refer to the relevant description of the corresponding steps in the above method described in the embodiment of the present disclosure, which will not be repeated herein.

Acquisition, storage and application of a user's personal information involved in the technical solution of the present application all comply with provisions of relevant laws and regulations, and do not violate public order and good customs.

According to the embodiment of the present disclosure, the present disclosure also provides an electronic device, and a readable storage medium.

Figure 9:
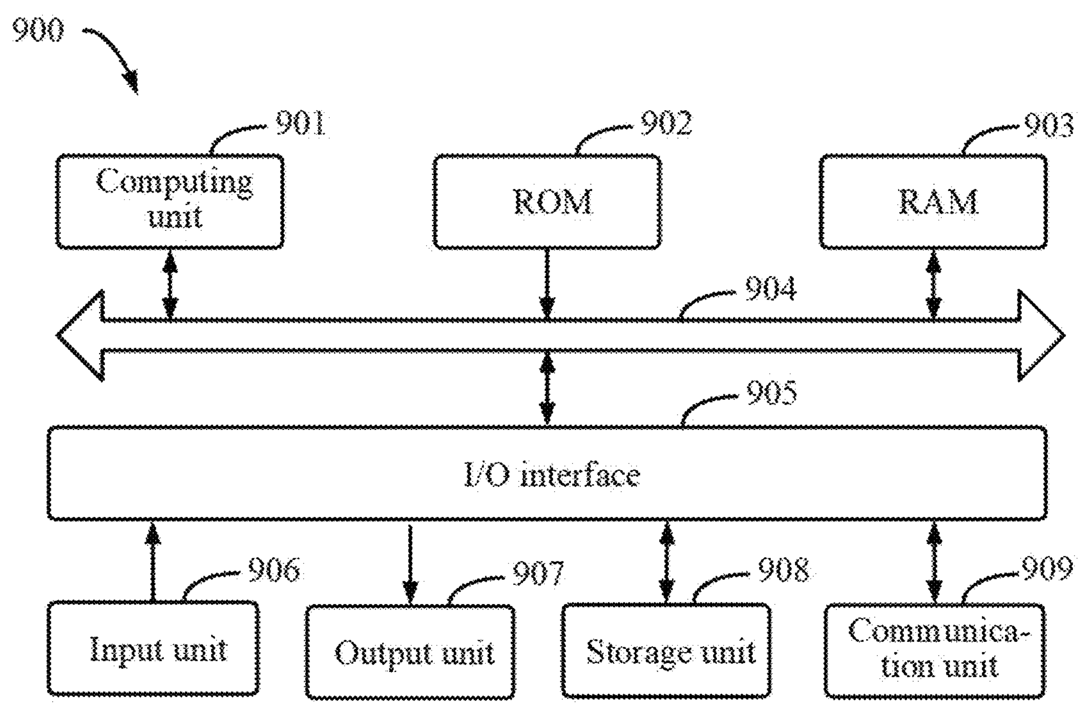
FIG. 9 is a schematic block diagram of an exemplary electronic device 900 according to the embodiment of the present disclosure.

FIG. 9 shows a schematic block diagram of an exemplary electronic device 900 that may be used to implement the embodiment of the present disclosure. The electronic device is intended to represent various forms of digital computers, such as a laptop, a desktop, a workstation, a personal digital assistant, a server, a blade server, a mainframe computer, and other suitable computers. The electronic device may also represent various forms of mobile devices, such as a personal digital processing, a cellular phone, a smart phone, a wearable device and other similar computing devices. The components shown herein, their connections and relationships, and their functions are merely examples, and are not intended to limit the implementation of the present disclosure described and/or required herein.

As shown in FIG. 9, the device 900 includes a computing unit 901 that may perform various appropriate actions and processes according to a computer program stored in a Read-Only Memory (ROM) 902 or a computer program loaded from a storage unit 908 into a Random-Access Memory (RAM) 903. Various programs and data required for an operation of device 900 may also be stored in the RAM 903. A computing unit 901, the ROM 902 and the RAM 903 are connected to each other through a bus 904. An input/output (I/O) interface 905 is also connected to the bus 904.

A plurality of components in the device 900 is connected to the I/O interface 905, and includes an input unit 906 such as a keyboard, a mouse, or the like; an output unit 907 such as various types of displays, speakers, or the like; the storage unit 908 such as a magnetic disk, an optical disk, or the like; and a communication unit 909 such as a network card, a modem, a wireless communication transceiver, or the like. The communication unit 909 allows the device 900 to exchange information/data with other devices through a computer network such as the Internet and/or various telecommunication networks.

The computing unit 901 may be various general-purpose and/or special-purpose processing components with processing and computing capabilities. Some examples of the computing unit 901 include, but are not limited to, a Central Processing Unit (CPU), a Graphics Processing Unit (GPU), various dedicated Artificial Intelligence (AI) computing chips, various computing units that run machine learning model algorithms, a Digital Signal Processor (DSP), and any appropriate processors, controllers, microcontrollers, or the like. The computing unit 901 performs various methods and processing described above, such as the lane line recognition method. For example, in some implementations, the lane line recognition method may be implemented as a computer software program tangibly contained in a computer-readable medium, such as the storage unit 908. In some implementations, a part or all of the computer program may be loaded and/or installed on the device 900 via the ROM 902 and/or the communication unit 909. When the computer program is loaded into RAM 903 and executed by the computing unit 901, one or more steps of the lane line recognition method described above may be performed. Alternatively, in other implementations, the computing unit 901 may be configured to perform the lane line recognition method by any other suitable means (e.g., by means of firmware).

Various implementations of the system and technologies described above herein may be implemented in a digital electronic circuit system, an integrated circuit system, a Field Programmable Gate Array (FPGA), an Application Specific Integrated Circuit (ASIC), Application Specific Standard Parts (ASSP), a System on Chip (SOC), a Complex Programmable Logic Device (CPLD), a computer hardware, firmware, software, and/or a combination thereof. These various implementations may be implemented in one or more computer programs, which may be executed and/or interpreted on a programmable system including at least one programmable processor. The programmable processor may be a special-purpose or general-purpose programmable processor, may receive data and instructions from a storage system, at least one input device, and at least one output device, and transmit the data and the instructions to the storage system, the at least one input device, and the at least one output device.

The program code for implementing the method of the present disclosure may be written in any combination of one or more programming languages. The program code may be provided to a processor or controller of a general-purpose computer, a special-purpose computer or other programmable data processing devices, which enables the program code, when executed by the processor or controller, to cause the function/operation specified in the flowchart and/or block diagram to be implemented. The program code may be completely executed on a machine, partially executed on the machine, partially executed on the machine as a separate software package and partially executed on a remote machine, or completely executed on the remote machine or a server.

In the context of the present disclosure, a machine-readable medium may be a tangible medium, which may contain or store a procedure for use by or in connection with an instruction execution system, device or apparatus. The machine-readable medium may be a machine-readable signal medium or a machine-readable storage medium. The machine-readable medium may include, but is not limited to, an electronic, magnetic, optical, electromagnetic, infrared or semiconductor system, device or apparatus, or any suitable combination thereof. More specific examples of the machine-readable storage medium may include electrical connections based on one or more lines, a portable computer disk, a hard disk, a Random-Access Memory (RAM), a Read-Only Memory (ROM), an Erasable Programmable Read-Only Memory (EPROM or a flash memory), an optical fiber, a portable Compact Disc Read-Only Memory (CD-ROM), an optical storage device, a magnetic storage device, or any suitable combination thereof.

In order to provide interaction with a user, the system and technologies described herein may be implemented on a computer that has: a display apparatus (e.g., a cathode ray tube (CRT) or a Liquid Crystal Display (LCD) monitor) for displaying information to the user; and a keyboard and a pointing device (e.g., a mouse or a trackball) through which the user may provide input to the computer. Other types of devices may also be used to provide interaction with the user. For example, feedback provided to the user may be any form of sensory feedback (e.g., visual feedback, auditory feedback, or tactile feedback), and the input from the user may be received in any form (including an acoustic input, a voice input, or a tactile input).

The system and technologies described herein may be implemented in a computing system (which serves as, for example, a data server) including a back-end component, or in a computing system (which serves as, for example, an application server) including a middleware, or in a computing system including a front-end component (e.g., a user computer with a graphical user interface or web browser through which the user may interact with the implementation of the system and technologies described herein), or in a computing system including any combination of the back-end component, the middleware component, or the front-end component. The components of the system may be connected to each other through any form or kind of digital data communication (e.g., a communication network). Examples of the communication network include a Local Area Network (LAN), a Wide Area Network (WAN), and the Internet.

A computer system may include a client and a server. The client and server are generally far away from each other and usually interact with each other through a communication network. A relationship between the client and the server is generated by computer programs running on corresponding computers and having a client-server relationship with each other. The server may be a cloud server, a distributed system server, or a block chain server.

It should be understood that, the steps may be reordered, added or removed by using the various forms of the flows described above. For example, the steps recorded in the present disclosure can be performed in parallel, in sequence, or in different orders, as long as a desired result of the technical scheme disclosed in the present disclosure can be realized, which is not limited herein.

The foregoing specific implementations do not constitute a limitation on the protection scope of the present disclosure. Those having ordinary skill in the art should understand that, various modifications, combinations, sub-combinations and substitutions may be made according to a design requirement and other factors. Any modification, equivalent replacement, improvement or the like made within the spirit and principle of the present disclosure shall be included in the protection scope of the present disclosure.

What is claimed is:

1. A lane line recognition method, comprising:

extracting a basic feature of an original image;

recognizing at least one lane line node in the original image by using the basic feature of the original image;

extracting a local feature from the basic feature of the original image by using the at least one lane line node;

fusing the basic feature and the local feature; and recognizing a lane line in the original image based on a fused result, by:

determining lane line coding information of the original image based on the fused result; and recognizing the lane line in the original image by using the lane line coding information;

wherein the lane line coding information of the original image comprises first information of each pixel in the original image, and the first information of each pixel in the original image comprises at least one of:

whether the pixel is the lane line node, a quantity of adjacent lane line nodes of the pixel, or a positional relationship of the pixel and an adjacent lane line node.

2. The method of claim 1, wherein first information of a specific pixel is represented by a three-dimensional vector, and two elements in the three-dimensional vector represent a position of the specific pixel in the original image, and another element in the three-dimensional vector represents the first information of the specific pixel.

3. The method of claim 1, wherein in a case where the pixel is the lane line node, the positional relationship of the pixel and the adjacent lane line node comprises:

a deflection angle of a connecting line between the pixel and the adjacent lane line node relative to a coordinate axis of the original image; and a length of the connecting line between the pixel and the adjacent lane line node.

4. The method of claim 1, wherein extracting the local feature from the basic feature of the original image by using the lane line node comprises:

constructing a plurality of local boxes by using the lane line node; and segmenting the basic feature of the original image by using the plurality of local boxes, to obtain the local feature.

5. The method of claim 4, wherein constructing the plurality of local boxes by using the lane line node comprises:

constructing four local boxes by using the lane line node, so that the lane line node is located at a lower right corner, a lower left corner, an upper right corner or an upper left corner of respective one of the four local boxes;

wherein dimensions of the four local boxes are preset values.

6. The method of claim 5, wherein the basic feature is represented by a first vector, and the local feature is represented by a second vector, and fusing the basic feature and the local feature comprises: combining the first vector and the second vector to obtain a third vector.

7. The method of claim 1, wherein recognizing the at least one lane line node in the original image by using the basic feature of the original image comprises:

determining node distribution information corresponding to the original image by using the basic feature of the original image; wherein the node distribution information represents the at least one lane line node in the original image and comprises a type of each pixel in the original image.

8. An electronic device, comprising:

at least one processor; and a memory connected in communication with the at least one processor, wherein the memory stores an instruction executable by the at least one processor, and the instruction, when executed by the at least one processor, enables the at least one processor to execute operations comprising:

extracting a basic feature of an original image;

recognizing at least one lane line node in the original image by using the basic feature of the original image;

extracting a local feature from the basic feature of the original image by using the at least one lane line node;

fusing the basic feature and the local feature; and recognizing a lane line in the original image based on a fused result, by:

determining lane line coding information of the original image based on the fused result; and recognizing the lane line in the original image by using the lane line coding information;

wherein the lane line coding information of the original image comprises first information of each pixel in the original image, and the first information of each pixel in the original image comprises at least one of:

whether the pixel is the lane line node, a quantity of adjacent lane line nodes of the pixel, or a positional relationship of the pixel and an adjacent lane line node.

9. The electronic device of claim 8, wherein first information of a specific pixel is represented by a three-dimensional vector, and two elements in the three-dimensional vector represent a position of the specific pixel in the original image, and another element in the three-dimensional vector represents the first information of the specific pixel.

10. The electronic device of claim 8, wherein in a case where the pixel is the lane line node, the positional relationship of the pixel and the adjacent lane line node comprises:

a deflection angle of a connecting line between the pixel and the adjacent lane line node relative to a coordinate axis of the original image; and a length of the connecting line between the pixel and the adjacent lane line node.

11. The electronic device of claim 8, wherein extracting the local feature from the basic feature of the original image by using the lane line node comprises:

constructing a plurality of local boxes by using the lane line node; and segmenting the basic feature of the original image by using the plurality of local boxes, to obtain the local feature.

12. The electronic device of claim 11, wherein constructing the plurality of local boxes by using the lane line node comprises:

constructing four local boxes by using the lane line node, so that the lane line node is located at a lower right corner, a lower left corner, an upper right corner or an upper left corner of respective one of the four local boxes;

wherein dimensions of the four local boxes are preset values.

13. The electronic device of claim 12, wherein the basic feature is represented by a first vector, and the local feature is represented by a second vector, and fusing the basic feature and the local feature comprises: combining the first vector and the second vector to obtain a third vector.

14. The electronic device of claim 8, wherein recognizing the at least one lane line node in the original image by using the basic feature of the original image comprises:

determining node distribution information corresponding to the original image by using the basic feature of the original image; wherein the node distribution information represents the at least one lane line node in the original image and comprises a type of each pixel in the original image.

15. A non-transitory computer-readable storage medium storing a computer instruction thereon, wherein the computer instruction is used to cause a computer to execute a method comprising:

extracting a basic feature of an original image;

recognizing at least one lane line node in the original image by using the basic feature of the original image;

extracting a local feature from the basic feature of the original image by using the at least one lane line node;

fusing the basic feature and the local feature; and recognizing a lane line in the original image based on a fused result, by:

determining lane line coding information of the original image based on the fused result; and recognizing the lane line in the original image by using the lane line coding information;

wherein the lane line coding information of the original image comprises first information of each pixel in the original image, and the first information of each pixel in the original image comprises at least one of:

whether the pixel is the lane line node, a quantity of adjacent lane line nodes of the pixel, or a positional relationship of the pixel and an adjacent lane line node.

16. The non-transitory computer-readable storage medium of claim 15, wherein first information of a specific pixel is represented by a three-dimensional vector, and two elements in the three-dimensional vector represent a position of the specific pixel in the original image, and another element in the three-dimensional vector represents the first information of the specific pixel.

17. The non-transitory computer-readable storage medium of claim 15, wherein in a case where the pixel is the lane line node, the positional relationship of the pixel and the adjacent lane line node comprises:

a deflection angle of a connecting line between the pixel and the adjacent lane line node relative to a coordinate axis of the original image; and a length of the connecting line between the pixel and the adjacent lane line node.

18. The non-transitory computer-readable storage medium of claim 15, wherein extracting the local feature from the basic feature of the original image by using the lane line node comprises:

constructing a plurality of local boxes by using the lane line node; and segmenting the basic feature of the original image by using the plurality of local boxes, to obtain the local feature.

19. The non-transitory computer-readable storage medium of claim 18, wherein constructing the plurality of local boxes by using the lane line node comprises:

constructing four local boxes by using the lane line node, so that the lane line node is located at a lower right corner, a lower left corner, an upper right corner or an upper left corner of respective one of the four local boxes;

wherein dimensions of the four local boxes are preset values.

20. The non-transitory computer-readable storage medium of claim 19, wherein the basic feature is represented by a first vector, and the local feature is represented by a second vector, and fusing the basic feature and the local feature comprises: combining the first vector and the second vector to obtain a third vector.

* * * * *